(No Model.) 2 Sheets—Sheet 1.

W. LOUDEN.
HORSE HAY FORK.

No. 465,380. Patented Dec. 15, 1891.

Witnesses.
R. B. Louden
C. M. McElroy

Inventor:
William Louden (No Model.) 2 Sheets—Sheet 2.
W. LOUDEN.
HORSE HAY FORK.
No. 465,380. Patented Dec. 15, 1891.
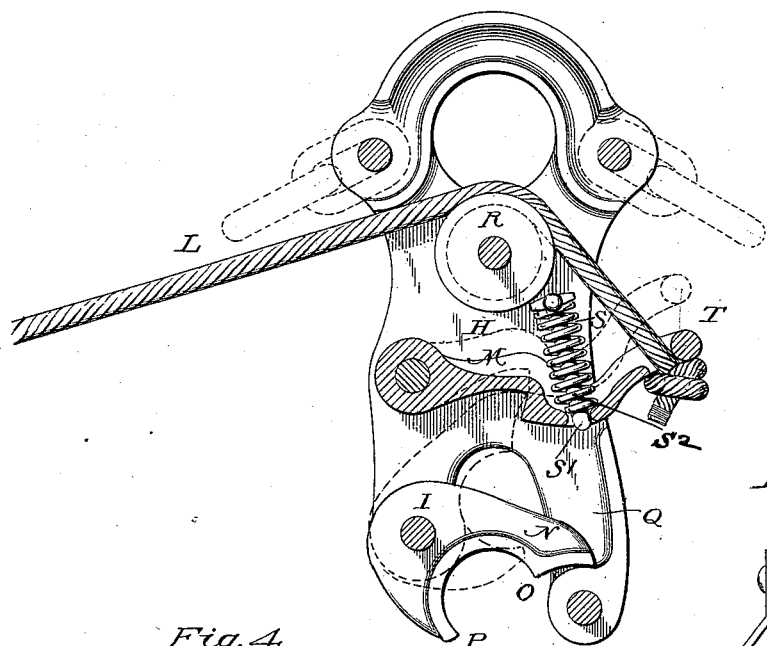
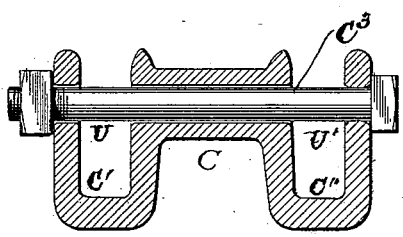
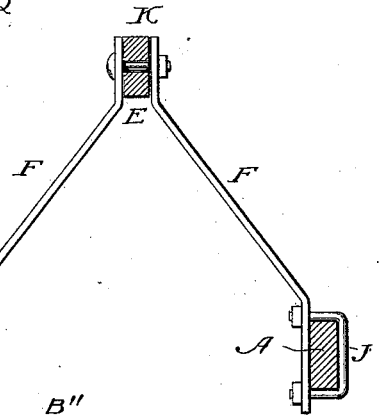
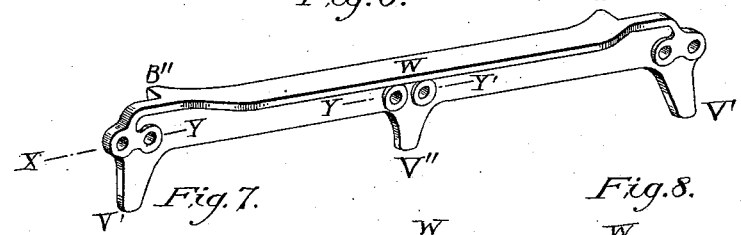
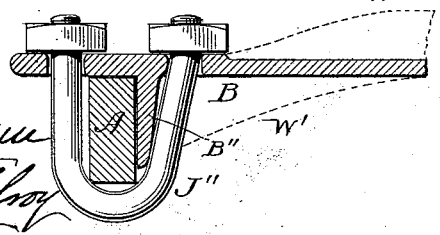
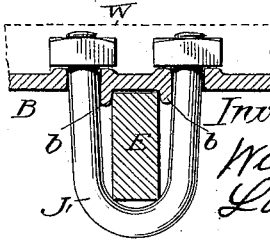
Witnesses:
R. B. Louden
C. M. McElroy
Inventor:
William Louden

UNITED STATES PATENT OFFICE.

WILLIAM LOUDEN, OF FAIRFIELD, IOWA.

HORSE HAY-FORK.

SPECIFICATION forming part of Letters Patent No. 465,380, dated December 15, 1891.

Application filed September 25, 1891. Serial No. 406,876. (No model.)

*To all whom it may concern:*

Be it known that I, WILLIAM LOUDEN, a citizen of the United States, residing at Fairfield, in the county of Jefferson and State of Iowa, have invented a new and useful Improvement in Horse Hay-Forks, of which the following is a specification.

My invention relates to that class of forks known as "grapples;" and it consists, primarily, in attaching the ropes or chains used to connect the head to the outer parts of the fork (when its central connection is released to discharge its load) to an arched support formed upon or of the tines, so that the tines may be easily drawn apart to discharge the hay, and then be held in a balanced position so as to be easily reset in the hay.

It also consists of an improved form of the detachable head, whereby its central connection with the fork can be more easily and quickly made or released, and in other improved details hereinafter set forth, whereby the tines are more easily and securely connected together and their operation more perfectly controlled.

I attain these objects by the mechanism illustrated in the accompanying drawings, in which—

Figure 1:
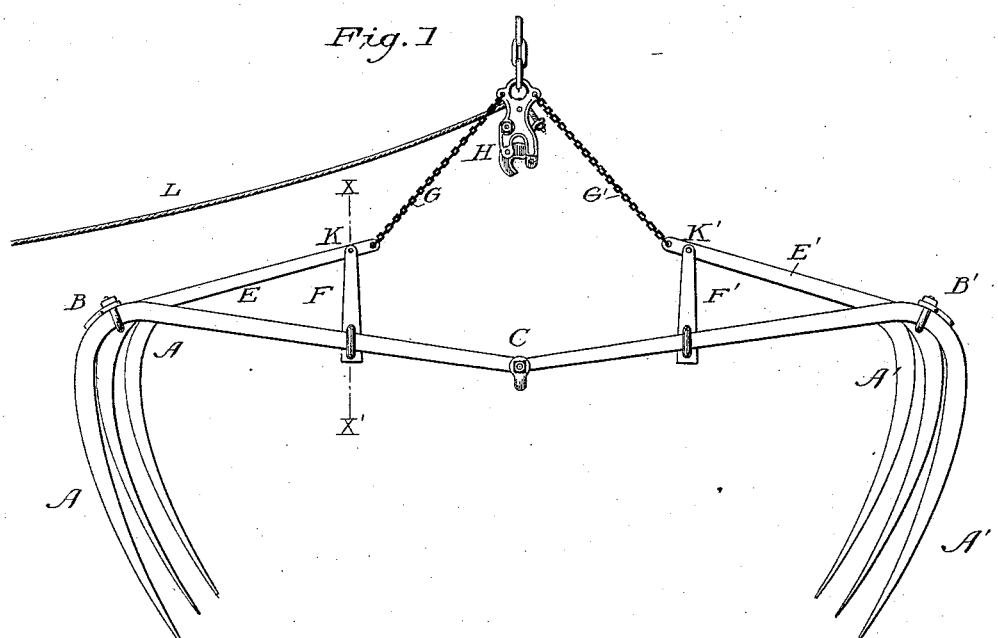
Figure 2:
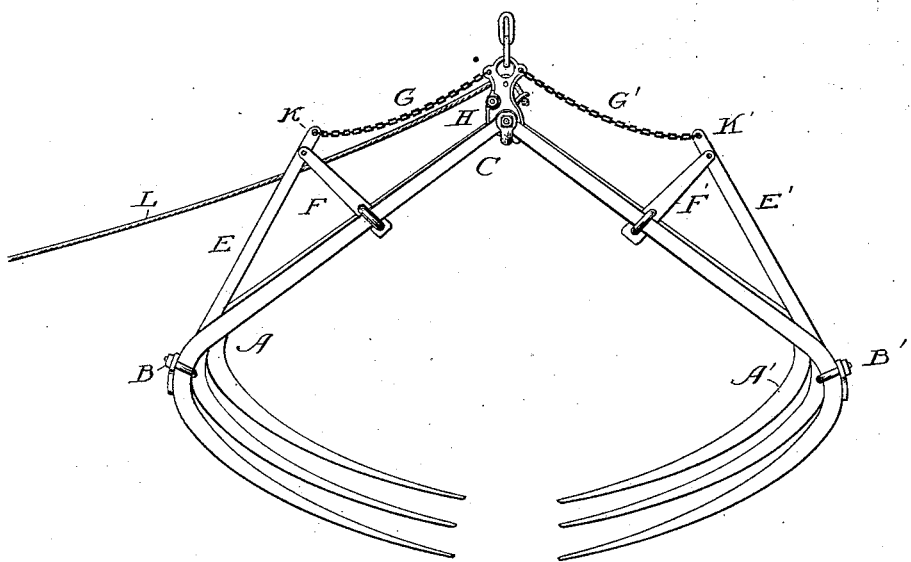

Figure 1 is a side view of my fork, showing it in its open or discharged position. Fig. 2 is a perspective showing the fork in its closed or loaded position. Fig. 3 is a detail view of the head, the near side being removed to show the working parts. Fig. 4 is a sectional view of the pivoted coupling which holds the two sides of the fork together and to which the head is connected to carry the load. Fig. 5 is a sectional view of the arched supports to which the ropes or chains are attached, which is drawn on the line X X' in Fig. 1. Fig. 6 is a top view of one of the connecting-bars B and B', which hold the tines together near their outer ends, as shown in Figs. 1 and 2. Fig. 7 is a sectional view drawn on the line X Y in Fig. 6, showing the attachment of the main tines to the connecting-bars B and B'. Fig. 8 is a sectional view, drawn on the line Y Y', showing the attachment to the connecting-bars B and B' of the central tines (or braces) E and E', which form parts of the arched supports.

Similar letters refer to similar parts throughout the several views.

A and A' represent two sets of grappling-tines, each set being held together by connecting-bars B and B', and the whole pivoted together at their inner ends by the coupling C. Central pieces E E', having their inner ends K K' elevated above the level of the tines, are secured to the central parts of the connecting-bars B and B', and may have their lower ends extended so as to form central tines, if desired, as shown in Figs. 1 and 2. The upper ends K and K' of these central pieces are further held in place by braces F F and F' F', secured to the main tines, as fully shown in Figs. 1, 2, and 5, the whole forming substantial elevated supports, to which the ropes or chains G G', connecting the head H, are secured. The head H is provided with a grappling device to engage the coupling C, to which the main tines are connected. Elevating-power being applied to the head H, the fork is drawn into the position shown in Fig. 2, and all the hay within the grasp of the tines is securely held until the head is released from the coupling C by a pull on the trip-cord L. The sustaining-point is now shifted from the coupling C to the points K and K' of the arched supports where the ropes or chains are attached, and the coupling will drop and the tines spread apart and discharge the hay.

I claim the following as some of the advantages of this construction over those in common use. The sustaining-points K and K' being located centrally over each set of tines and elevated to some extent above them, the coupling C will not drop much, if any, below the general level of the tines and will not require any central spear or other stopping devices to keep it from dropping too low and the points of the tines from being drawn too high to insert in the hay. Also, in discharging the hay it requires a considerable angle between the connecting-chains and the tines from the coupling C to the connecting-bars B and B' to draw the tines from under a nar- row load, and without my arched supports the chains would have to be made extra long to secure this angle while the fork is in loaded position, as shown in Fig. 2, and this extra length of the chains would require extra space in the mow to discharge the fork. By reason of my arched supports the tines are easily spread to discharge the hay, but will not spread too far. Furthermore, the pieces F F and F' F' are secured to the tines by clip-bolts J J, as shown in Fig. 5, and the other pieces E and E', comprising the arched supports, are also secured to the connecting-bars B and B' by clip-bolts J', as shown in Fig. 8, so that they can be readily adjusted back or forth to regulate the set and balance of the tines, as desired. The lower end of the head H is forked, so that it will straddle the coupling C. In one of the forked parts a hook I is pivoted, as shown, and is fitted to engage a hooked catch M. When disengaged from the catch M, the hook I drops to the position shown in Fig. 3, the point N passing down the recess in the part Q until it rests on the closed end below. The forked end of the head H now being pressed down over the central part of the coupling C, the hook I will be rotated by the coupling coming in contact with it at O until the point N engages the hook of the catch M, and the point P will hold the coupling C securely in the fork of the head H. A pull on the trip-cord L, which is passed over the sheave R and secured to the eye T of the catch M, will release the hook I and allow the coupling to drop, as already described.

In order to make the catch M more effective, I use a T-shaped pin S. The horizontal arms of this pin are pivoted in the sides of the head H, while a coiled spring $S^2$ encircles its lower and pointed end. The extreme point S' of the pin passes through a hole in the catch M, while the spring rests in a recess in the body of the catch and holds it in engagement with the hook I.

The coupling C is made with an elongated central part for the engagement of the head H and two forked ends U and U' for the connection of the tines. The pivoted ends of the tines are placed in the forks U and U' in pairs, and are held in position by a bolt or pin $C^3$, passed through the coupling C, as shown in Fig. 4, and also through holes in the ends of the tines. The parts C' and C'' of the coupling coming under the tines form stops to prevent the tines from being drawn too close together when in loaded position, as shown in Fig. 2. This dispenses with the necessity for any extra stops or checking devices, and the whole forms a very simple, cheap, and durable coupling for a grapple-fork, which can be cheaply applied and easily operated.

The manner of securing the tines to the connecting-bars B and B' is plainly shown in Fig. 7. Right-angle flanges B'' are formed on the under sides of the connecting-bars B and B' transversely, as shown in Fig. 6. The tines A are set in the angles formed by these flanges and the main body of the connecting-bars, and are held in place by clip-bolts J''. These flanges B'', in combination with the extended points V' of the connecting-bars B and B', which are made to fit the curve of the tines, form a very solid support to hold the tines in place. When central tines are used, central extended supports V'' and smaller flanges b b can also be used to strengthen the tines and hold them in place.

Having thus described my invention, what I claim as new, and desire to secure by Letters Patent, is—

1. The combination of two sets of grappling-tines coupled together, a detachable head to engage the coupling, arched supports formed on the tines, and flexible fastenings to connect the arched supports and detachable head together, substantially as and for the purpose set forth.

2. The combination of the tines A and A', detachable head H, chains G and G', and arched supports K and K', the pieces comprising the supports being adjustably secured to the fork, substantially as set forth.

3. The combination of the tines A and A', detachable head H, chains G and G', arched supports K and K', and the pieces E and E', forming parts of the supports, having their lower ends extended so as to form central tines, substantially as set forth.

4. In grappling forks, the coupling C, having an elongated central part for the engagement of a detachable head, and forked ends to connect the tines, substantially as shown and described.

5. In grappling-forks, the coupling C, having forked ends U and U', and the parts C' and C'' of the forked ends, forming stops to keep the tines from being drawn too closely together, substantially as set forth.

6. In grappling-forks, the combination of the tines pivoted together by an elongated coupling, and a detachable head fitted with a trip-catch and connected to the tines by flexible fastenings, the lower end of the head being forked to pass over and engage the coupling.

7. In grappling-forks having a detachable head with forked ends to engage a coupling C, the combination of the hook I, catch M, and pin S, supporting a coiled spring to hold the catch M in engagement with hook I, substantially as set forth.

8. In grappling-forks having a detachable head with forked ends to engage a coupling C, the combination and arrangement of the hook I, catch M, coiled spring and pin S, sheave R, and trip-cord L, substantially as shown and described.

9. In grappling-forks, the combination of the connecting-bars B and B', having angular flanges B'', with clip-bolts J'' to hold the tines securely to the connecting-bars, substantially as shown.

10. In grappling-forks, the combination of the tines A and A' with connecting-bars B and B', the connecting-bars being fitted with extended points V', adapted to strengthen the tines, substantially as set forth.

In testimony whereof I affix my signature in the presence of two witnesses.

WILLIAM LOUDEN.

Witnesses:
NELLIE CRAIG LOUDEN,
R. B. LOUDEN.